United States Patent [19]

Smith et al.

[11] 3,900,227

[45] Aug. 19, 1975

[54] BRAKE CONTROL ARRANGEMENT FOR SKIDDERS

[75] Inventors: Duane R. Smith, Montgomery; Rodney H. Anderson, Naperville, both of Ill.

[73] Assignee: Caterpillar Tractor Company, Peoria, Ill.

[22] Filed: Apr. 9, 1973

[21] Appl. No.: 349,315

Related U.S. Application Data

[63] Continuation of Ser. No. 130,938, April 5, 1971, abandoned.

[52] U.S. Cl. .................. 303/7; 303/52; 303/54; 303/56
[51] Int. Cl. ............................................. B60t 13/14
[58] Field of Search .......... 303/7, 2, 52, 53, 54, 13, 303/40, 9; 188/106 P, 3

[56] References Cited
UNITED STATES PATENTS

| | | |
|---|---|---|
| 3,047,341 | 7/1962 | Alfieri .................................. 303/7 |
| 3,169,804 | 12/1965 | Bueler et al. ......................... 303/52 |
| 3,265,447 | 8/1966 | Bueler .................................. 303/13 |
| 3,415,576 | 12/1968 | Henry-Biabaud .................... 303/53 |
| 3,463,557 | 8/1969 | Alfieri ................................... 303/52 |

FOREIGN PATENTS OR APPLICATIONS

| | | | |
|---|---|---|---|
| 516,593 | 1/1940 | United Kingdom ................. 303/53 |

*Primary Examiner*—Trygve M. Blix
*Assistant Examiner*—D. C. Butler
*Attorney, Agent, or Firm*—Phillips, Morre, Weissenberger, Lempio & Strabala

[57] ABSTRACT

A control system for a dual brake system adapted to be used with articulated vehicles such as logging skidders. The brake control system is controlled by a pair of valves inter-connected to be actuated by a common control lever or pedal and interconnected such that full modulation and actuation of the service brakes may be accomplished prior to beginning control of the back-up brake system which may also be fully modulated and controlled independently of or coextensive with full application of the service brakes.

13 Claims, 3 Drawing Figures

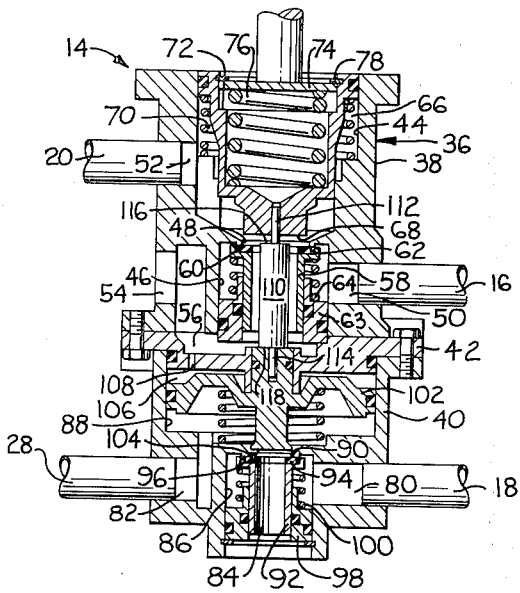

PATENTED AUG 19 1975

INVENTORS
DUANE R. SMITH
RODNEY H. ANDERSON

BY
Fryer, Tjensvold, Feix, Phillips & Lempio
ATTORNEYS 3,900,227

BRAKE CONTROL ARRANGEMENT FOR SKIDDERS

This is a continuation, of Ser. No. 130,938, Filed Apr. 5, 1971 now abandoned.

BACKGROUND OF THE INVENTION

The present invention relates to a brake control system, and pertains more particularly to a brake control system for sequential application of a plurality of brake systems.

Many heavy duty vehicles operate under varying conditions such that at times only normal or ordinary braking is required and at other times rather severe braking is required. Typical of vehicles having such diverse braking conditions are vehicles used in the logging industry and normally referred to as skidders. Such vehicles are normally employed in the logging industry to gather logs from a forest and assemble them in an area to be loaded on a highway truck or other suitable transport vehicle. A typical example of such vehicles is shown in U.S. Pat. No. 2,829,715 issued Mar. 25, 1958. Such vehicles are typically constructed to pivot at the center thereof around a vertical axis and to oscillate about a horizontal axis. This articulated construction provides conditions which impose severe stresses on control cables or conduits that must extend across the articulated hitch between the front and rear of the vehicle.

These conditions result in frequent failure of such hydraulic lines and control cables which extend between these portions of the vehicle.

The use of drive line brakes in combination with front wheel brakes would provide adequate braking. However, such a combination would create severely unbalanced wear between brake systems, and excessive heat problems. Although the wheel brakes could be adequately cooled under normal conditions, drive line brakes cannot easily be cooled and thus are subject to excessively high wear rate, and excessive heat which may cause failure and in addition can create a hazard of fires.

It is therefore a primary object of the present invention to provide a braking system that overcomes the above disadvantages of the prior art.

It is a further object of the present invention to provide an improved braking system which is operative to meet the varying conditions of logging vehicles.

A still further object of the present invention is to provide an improved control means for a dual braking system such that the braking system can be sequentially operated.

In accordance with the present invention, a vehicle is provided with front wheel brakes which are adequate under normal operating conditions and in addition is supplied with sequentially operated drive line brakes to serve in severe operating conditions.

BRIEF DESCRIPTION OF THE DRAWINGS

The above and other objects and advantages of the present invention will become more apparent from the following description when read in conjunction with the accompanying drawings wherein:

FIG. 1 is a schematic layout of a preferred embodiment of the present invention.

FIG. 2 is an elevational view in section of a preferred embodiment of the main control valve for the present invention.

FIG. 3 is a schematic layout of an alternate embodiment of the present invention.

DETAILED DESCRIPTION OF PREFERRED EMBODIMENTS

Referring now to the drawings and in particular to FIG. 1 there is illustrated a control system which includes a suitable source of pressurized fluid such as a compressor 10 supplying fluid to a reservoir 12 which is connected to a main control valve 14 by means of conduits 16 and 18. The main control valve 14 is provided with a pair of separate outlet ports with a conduit 20 connecting one of said outlet ports to a master cylinder 22 which controls hydraulic fluid by means of conduit 26 to wheel brake assemblies 24. Another service conduit 28 connects the other outlet port of the control valve 14 with a master cylinder 30 which operatively controls hydraulic fluid to a brake assembly 32 by means of hydraulic conduits or conduit 34.

The control valve 14 is operative in response to suitable control means such as a lever or foot pedal 35 to completely control the application of brakes 24 from light actuation to full actuation totally independent of the brakes 32. After full actuation of the brakes 24, the foot pedal 35 is operative through further depression to further actuate the control valve 14 to completely control the application of brakes 32. In other words, the foot pedal or control means 35, is operative through a first range of movement to control the operation of brakes 24 or the main wheel brakes of the vehicle, and is operative through a second range of movement thereafter to sequentially operate a second brake system 32 such as drive line brakes.

Referring now to FIG. 2 there is shown in detail a control valve 14 particularly adapted for sequential operation by the control system such as that described above. A valve comprises a housing 36 having an upper housing 38 and a lower housing 40 and an intermediate partition 42. The upper housing 38 is provided with an upper cylindrical bore 44 and a lower cylindrical bore 46 interconnected by a passageway 48. The upper housing has an inlet opening 50 opening into the lower cylindrical bore 46 and an outlet opening 52 communicating with the upper cylindrical bore 44. An exhaust port 54 is provided in the upper housing and communicates by means of a passageway 56 with the bore of sleeve 58.

Communications between the inlet opening 50 and the outlet 52 are controlled by valve means comprising an annular sleeve element 58 carrying a resilient sealing element 60 carried at the upper end of the sleeve element 58 and biased into sealing engagement with the valve seat 62 formed around the periphery of opening 48. The sleeve element 58 is slidably mounted in an annular insert member 63 and is biased by means of resilient spring member 64 into the upward or sealing position.

The valve means 58 is controlled by suitable control means comprising a reaction piston 66 reciprocally mounted in a cylindrical bore 44, and has a valve seat 68 formed on a lower end thereof, adapted to engage the annular resilient sealing disc 60 to thereby block communication between the outlet control port 52 and the exhaust port 54. A spring 70 normally maintains the reaction piston 66 in the uppermost position. The stepped bore is formed in the piston 66 with a shoulder 72 formed between the diameters of the bore for engagement by means of a force receiving plate 74 which applies force by means of a spring 76 to the reaction piston 66. This construction permits force receiving plates 74 to move with varying degrees of force between retainer rings 78 and the shoulder 72. Thereafter, movement of the plate 74 is translated into direct movement of piston 66.

Second valve means for controlling the second brake system is disposed in the lower housing 40 and is operative to control the flow of fluid, such as pressurized air, between an inlet opening 80 and outlet opening 82 and then the exhaust opening at 84. The lower housing comprises a cylindrical bore 86 forming an inlet chamber and a cylindrical bore 88 forming an outlet chamber and being interconnected by passage 90 formed in the wall therebetween.

The flow of fluid between the inlet 80 and the outlet 82 is controlled by suitable control means or valve means comprising an annular sleeve element or member 92 carrying on annular resilient sealing disc 94 which is adapted to engage valve seat 96 formed around the periphery of the opening 90. The annular sleeve 92 is reciprocally mounted within the bore of a retainer sleeve 98 mounted in the bore 86 and is biased in the upward or closed position by means of a spring 100. A relay piston 102 is reciprocally mounted within a chamber or bore 88 and includes a valve seat 104 extending downward from the piston and adapted to engage the valve element 94 to cut off communication between the outlet passage 82 and the exhaust passage 84 formed through the center of the sleeve 92. A chamber 106 formed in the bore 88 behind piston 102 is vented by way of a vent passage 108 to atmosphere by way of exhaust passage 54. This construction including a vent passage is in contrast to similarly designed valves for controlling co-ordinated braking systems wherein this chamber is normally connected to the outlet chamber formed below the reaction piston 66.

This isolates the relay piston 102 from the reaction piston 66 except for lost motion connection provided by link 110. The lost motion connection or link 110 includes upper and lower pins 112 and 114 disposed in bores formed in the respective pistons. Shoulders 116 and 118 on link 110 transmits force from piston 66 to piston 102. The shoulder 116 is spaced sufficiently away from the engaging shoulder 68 of piston 66 to permit full control of this upper valve means independently of the lower valve means.

This lost motion link arrangement permits full actuation and control of the first valve means before actuation of the second valve means can occur. More particularly, full movement of the reaction piston 66 throughout its reaction or control range for the first valve means can occur before any engagement of the lower end thereof with the shoulder 116 of the link 110. After the first valve means has been fully actuated, force is transmitted from the control pedal 35 through force receiving plate 74 through piston 66 and link 110 to the piston 102 for then fully actuating and controlling a second valve means.

With the above described arrangement, it can be seen that there is provided a system wherein a first brake system can be completely controlled, completely independent of a second interconnected brake control system. More particularly, this system is well adapted for use on a vehicle wherein a first brake system may be fully and completely used under normal or ordinary working conditions and wherein a second brake system may be sequentially operated when the vehicle is required to operate under occasional heavy brake requirement.

An alternate embodiment of the present invention is illustrated in FIG. 3 wherein like elements are designated by like numbers primed ('). More specifically this alternate system comprises a source 10' of power such as a pressurized fluid supplied to a storage tank 12' and conveyed therefrom by way of conduits 16' and 18' to a double control valve 14'. The control valve 14' controls the application of pressurized fluid by way of conduits 20' and 28' to first and second brake means 24' and 32'. This arrangement, as in the previous embodiment, provides for operator controlled sequential braking.

While the above described invention has been described with respect to a particular embodiment, it is to be understood that changes and modifications may be made therein without departing from the spirit and scope of the invention as defined in the appended claims.

What is claimed is:

1. An air pressure actuated hydraulic brake system having a first set of hydraulic motors actuated by a first master cylinder to brake the front wheels of a vehicle and a second set of hydraulic motors actuated by a second master cylinder to brake the rear wheels of said vehicle, a source of air pressure for actuating said master cylinders and control valve means for controlling the actuation of said master cylinders, the improvement comprising:

actuating means operatively connected to said valve means;

said control valve means responsive to said actuating means for supplying full actuating pressure to said first master cylinder prior to and independently of the application of full actuating pressure to said second master cylinder.

2. The system of claim 1 wherein said control valve comprises a housing having a central throughbore;

a first inlet opening operatively connected to said source;

a first outlet opening operatively connected to said first master cylinder;

a first valve means disposed in said housing throughbore and operative to control communication between said first inlet and said first outlet;

a second inlet operatively connected to said source;

a second outlet operatively connected to said second master cylinder;

a second valve means disposed in said housing throughbore and operative to control communication between said second inlet and said second outlet;

said actuating means connected for separately controlling said first and said second valve means;

said actuating means comprising lost motion linkage means interconnecting said valve means; and, said lost motion linkage means providing for complete modulation and control of said first valve means independently of said second valve means.

3. The brake control system of claim 2 wherein said linkage means is operative to provide full modulation and control of said second valve while said first valve is maintained fully actuated.

4. In combination, a pressure actuated sequential braking system incorporated in an articulated vehicle, said system comprising:
a source of pressurized fluid;
first and second actuable brake means including first and second valve means for separately braking front and rear wheels of a vehicle;
common control means including lost-motion linkage means interconnecting said first and second valve means operatively connected for sequentially operating said valve for sequentially controlling said brake means; and
said control means operative to engage and operate said first valve means for application of braking pressure up to full locking pressure to said first brake means over a first range of movement of said control means prior to initiation of said second brake means, and operative to engage and operate said second valve means for application of braking pressure up to full locking pressure to said second brake means over a second range of movement of said control means outside said first range of movement so that said engagement and operation of said valve means is non-overlapping.

5. A pressure actuated sequential braking system for an articulated vehicle, said system comprising:
a source of pressurized fluid;
first and second actuable brake means for separately braking front and rear wheels of a vehicle;
common control means including first and second coaxially disposed valve means operatively connected for sequentially controlling said brake means; and
said control means operative for application of braking pressure up to full locking pressure to said first brake means over a first range of movement of said control means prior to initiation of said second brake means, and for application of braking pressure up to full locking pressure to said second brake means over a second range of movement of said control means outside said first range of movement.

6. The invention of claim 5 wherein said valve means comprises a first fluid flow control valve member for controlling communication of pressurized fluid from said source for actuation of said first brake means and a second fluid flow control valve member for controlling communication of pressurized fluid from said source for actuation of said second brake means.

7. The invention of claim 6 comprising lost motion likage interconnecting said flow control valve members, said linkage comprising an elongated rod member having spaced annular shoulders engaging said respective valve members.

8. The invention of claim 7 wherein said linkage provides for full actuation of said first brake means before engaging said second valve member for application of said second brake means.

9. The invention of claim 8 wherein said first brake means are applied to the front wheels of said vehicle and said second brake means are applied to the rear wheels of said vehicle.

10. The invention of claim 9 wherein rear wheels are driven by a drive shaft and second brake means are applied to said drive shaft.

11. A pressure actuated sequential braking system for an articulated vehicle, said system comprising:
a source of pressurized fluid;
first and second actuable brake means for separately braking front and rear wheels of a vehicle;
common control means operatively connected for sequentially controlling said brake means; and
said control means operative for application of braking pressure up to full locking pressure to said first brake means over a first range of movement of said control means prior to initiation of said second brake means, and for application of braking pressure up to full locking pressure to said second brake means over a second range of movement of said control means outside said first range of movement,
said control means comprising first and second coaxially disposed valves to selectively communicate said source of pressurized fluid with said brake means, and lost-motion means to engage and actuate said second valve means to actuate said second brake means after said first brake means has been fully actuated to locking pressure.

12. A pressure actuated sequential braking system for an articulated vehicle, said system comprising:
a source of pressurized fluid;
first and second actuable brake means for separately braking front and rear wheels of a vehicle;
common control means operatively connected for sequentially controlling said brake means;
said control means operative for application of braking pressure up to full locking pressure to said first brake means over a first range of movement of said control means prior to initiation of said second brake means, and for application of braking pressure up to full locking pressure to said second brake means over a second range of movement of said control means outside said first range of movement;
said control means comprising a housing having a central throughbore divided into first and second independent chambers and vent means for selective communication with said chambers;
a first inlet opening operatively connected to said first chamber and said source;
a first outlet opening operatively connected to first chamber and said first brake means;
a first valve means disposed in said first chamber and operative to control communication between said first inlet and said first outlet;
a second inlet operatively connected to said second chamber and said source;
a second outlet operatively connected to said second chamber and second brake means;
a second valve means including piston means disposed in said second chamber and operative to control communication between said second inlet and said second outlet;
said piston means being in selective communication at one side thereof with said second inlet and in constant communication at the other side with said vent means;
actuating means connected for separately controlling said first and said second valve means;
said actuating means including lost-motion linkage means interconnecting said valve means; and said lost-motion linkage means providing for complete actuation of said first valve means independently of said second valve means.

13. The braking system of claim 12 wherein said first brake means are applied to the front wheels of said vehicle and said second brake means are applied to the rear wheels of said vehicle.

* * * * *